US010641980B2

(12) United States Patent
Sledzinski (10) Patent No.: US 10,641,980 B2
(45) Date of Patent: May 5, 2020

(54) RACK-MOUNTABLE FIBER OPTIC SPLICE ENCLOSURE

(71) Applicant: Panduit Corp., Tinley Park, IL (US)

(72) Inventor: Bon B. Sledzinski, Westmont, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/257,188

(22) Filed: Jan. 25, 2019

(65) Prior Publication Data

US 2019/0250355 A1    Aug. 15, 2019

Related U.S. Application Data

(60) Provisional application No. 62/631,161, filed on Feb. 15, 2018.

(51) Int. Cl.
*G02B 6/44* (2006.01)

(52) U.S. Cl.
CPC ................. *G02B 6/4455* (2013.01)

(58) Field of Classification Search
CPC .... G02B 6/4439; G02B 6/444; G02B 6/4441; G02B 6/4452–4455
USPC .................................................. 385/135–137
See application file for complete search history.

(56) References Cited

U.S. PATENT DOCUMENTS

| | | | | |
|---|---|---|---|---|
| 4,595,255 A | * | 6/1986 | Bhatt | G02B 6/4452 385/135 |
| 4,752,110 A | * | 6/1988 | Blanchet | G02B 6/4453 385/134 |
| 4,884,863 A | * | 12/1989 | Throckmorton | G02B 6/4441 385/135 |
| 4,971,421 A | * | 11/1990 | Ori | G02B 6/444 206/316.1 |
| 5,208,894 A | * | 5/1993 | Johnson | G02B 6/4452 385/135 |
| 5,519,804 A | | 5/1996 | Burek et al. | |
| 5,546,495 A | * | 8/1996 | Bruckner | G02B 6/4452 385/135 |
| 5,737,475 A | | 4/1998 | Regester | |
| 5,825,962 A | * | 10/1998 | Walters | G02B 6/4452 385/135 |
| 5,835,657 A | | 11/1998 | Suarez et al. | |
| 5,898,129 A | | 4/1999 | Ott et al. | |
| 6,226,436 B1 | | 5/2001 | Daoud et al. | |
| 6,438,310 B1 | | 8/2002 | Lance et al. | |
| 6,496,640 B1 | | 12/2002 | Harvey et al. | |
| 6,504,988 B1 | | 1/2003 | Trebesch et al. | |
| 6,748,155 B2 | | 6/2004 | Kim et al. | |
| 6,944,389 B2 | | 9/2005 | Giraud et al. | |

(Continued)

FOREIGN PATENT DOCUMENTS

EP         620462 A1      10/1994

*Primary Examiner* — Robert Tavlykaev
(74) *Attorney, Agent, or Firm* — Christopher S. Clancy; James H. Williams; Peter S. Lee (57) ABSTRACT

Disclosed herein is a rack-mountable fiber optic splice enclosure. The fiber optic splice enclosure may include a body having two opposing side walls and a bottom and a cover attached to the body. The fiber optic splice enclosure may also include a sliding tray disposed on two guide rails on the bottom of the body. At least one removable panel is removably attached to the cover via at least a pair of latches so that the removable panel is detachable from the cover and can be attached to the sliding tray at an angle to serve as a work surface for splice trays.

15 Claims, 10 Drawing Sheets

(56) References Cited

U.S. PATENT DOCUMENTS

| | | | |
|---|---|---|---|
| 7,970,249 B2 | 6/2011 | Solheid et al. | |
| 8,009,954 B2 | 8/2011 | Bran de Leon et al. | |
| 8,154,886 B2 | 4/2012 | Hendrix et al. | |
| 8,554,044 B2 | 10/2013 | Bran de Leon et al. | |
| 9,008,485 B2* | 4/2015 | Ramirez | G02B 6/4452 361/825 |
| 9,366,837 B2 | 6/2016 | Claessens et al. | |
| 9,423,585 B2 | 8/2016 | Timmins et al. | |
| 9,575,274 B2 | 2/2017 | Allen et al. | |
| 9,588,317 B2 | 3/2017 | Bryon et al. | |
| 9,791,653 B2 | 10/2017 | Aznag et al. | |
| 2002/0150370 A1* | 10/2002 | Battey | G02B 6/4454 385/135 |
| 2005/0237721 A1* | 10/2005 | Cowley | G02B 6/4452 361/727 |
| 2011/0274402 A1 | 11/2011 | Giraud et al. | |
| 2013/0188919 A1* | 7/2013 | Cubala | G02B 6/4439 385/135 |
| 2015/0219866 A1* | 8/2015 | Veatch | G02B 6/445 385/135 |
| 2017/0269324 A1 | 9/2017 | Im | |
| 2019/0101717 A1* | 4/2019 | Pilon | G02B 6/4455 |
| 2019/0107682 A1* | 4/2019 | Aramayo | G02B 6/4455 |

\* cited by examiner

RACK-MOUNTABLE FIBER OPTIC SPLICE ENCLOSURE

PRIORITY

This application claims the benefit of U.S. Provisional Application No. 62/631,161, filed on Feb. 15, 2018, the contents of which are incorporated herein by reference.

BACKGROUND

Large count fiber optic cables may be made up of a multitude of fibers. These fibers can be individual or arranged as ribbons. Fusion splicing is an efficient way to connect the fibers from a large count fiber optic cable (in some instances coming in from outside a data center building) to fibers in other, often smaller count, fiber optic cables within the data center (e.g., equipment side cables). A fiber optic splice enclosure may be used to house and protect the delicate fusion splice connections.

SUMMARY

The present disclosure provides new and innovative rack-mountable fiber optic splice enclosures. An example enclosure includes a body having two opposing side walls, a bottom, and a cover. Attached to the bottom of the body may be two guide rails. A sliding tray may be disposed on the two guide rails, and, in the example, the sliding tray may include a splice tray. The example enclosure may further include a first removable panel attached to the cover by a pair of latches. In the example enclosure, the first removable panel may be detachable from the cover and attachable to the sliding tray at an angle to serve as a work surface for the splice tray.

BRIEF DESCRIPTION OF THE DRAWINGS

The following detailed description references the drawings, wherein.

DETAILED DESCRIPTION

Reference will now be made to the accompanying drawings. Wherever possible, the same reference numbers are used in the drawings and the following description to refer to the same or similar parts. It is to be expressly understood, however, that the drawings are for illustration and description purposes only. While several examples are described in this document, modifications, adaptations, and other implementations are possible. Accordingly, the following detailed description does not limit the disclosed examples. Instead, the proper scope of the disclosed examples may be defined by the appended claims.

Figure 1:
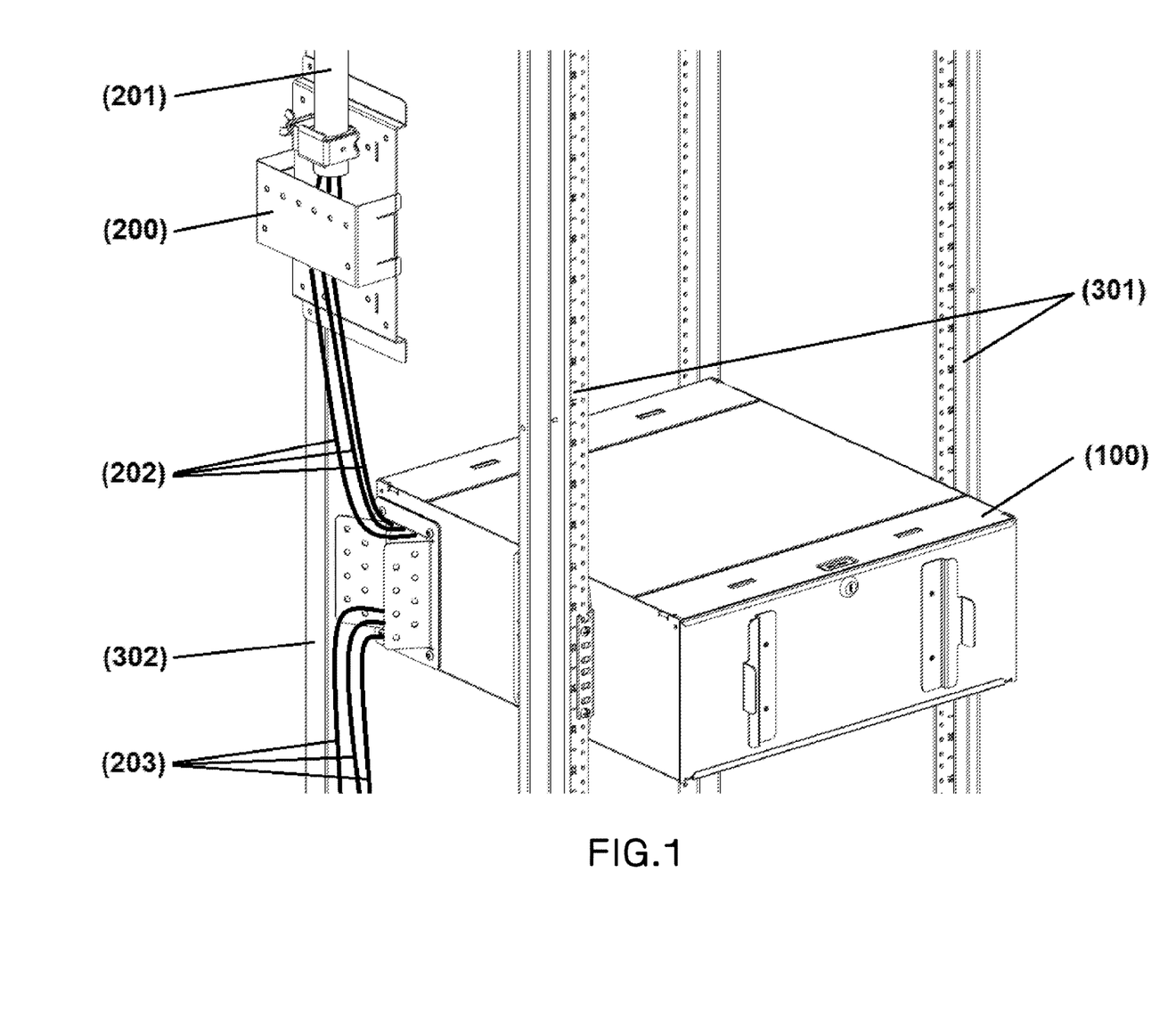
FIG. 1 is an illustration of an example fiber optic splice enclosure.

FIG. 1 illustrates an example rack-mountable fiber optic splice enclosure 100. Splice enclosure 100 is designed to be mounted to front rails 301 of a standard 19" rack or a cabinet, and functions as a junction for fibers from one or more large count fiber optic cables 201 and equipment side fiber optic cables 203. In an alternate embodiment, splice enclosure 100 may be designed to be mounted to racks or cabinets of varying sizes.

In the example, large count fiber optic cables 201 may be too rigid to be routed inside fiber optic splice enclosure 100, and therefore may be broken out into smaller, more flexible jacketed cables 202 at breakout box (or boxes) 200. Large count cables 201 may contain groups of jacketed cables 202 or sub-units, but those jackets may also be too rigid for tight bends inside fiber optic splice enclosure 100. The jackets may therefore be stripped from the sub-units and replaced with a flexible nylon or braided cable jacketing. Breakout box 200 may be attached to rear rails 302 of a rack or cabinet. A breakout box (not shown) may also be utilized on equipment side cables 203 if those cables are to be bundled into larger count cables, or to improve cable management.

Figure 2:
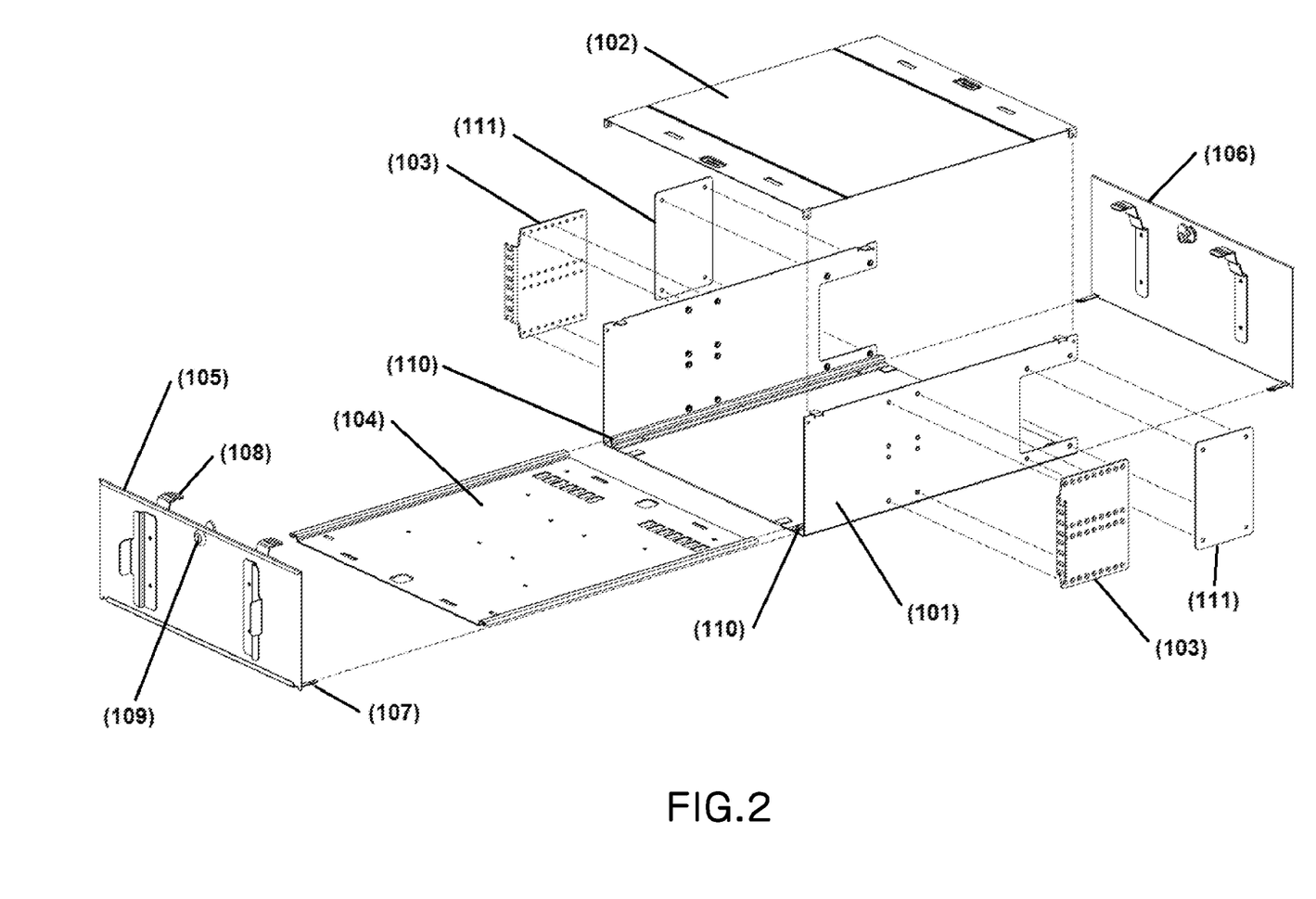
FIG. 2 is an exploded view of the example fiber optic splice enclosure shown in FIG. 1.

FIG. 2 illustrates an exploded view of rack-mountable fiber optic splice enclosure 100. As shown in FIG. 2, fiber optic splice enclosure 100 may be made up of a body 101 having two opposing side walls, a bottom, and a cover 102 attached to body 101 with screws. Two guide rails 110 may be attached to the bottom of body 101 and may allow a sliding tray 104 to move linearly forward at least partially out of a front opening formed by body 101 and cover 102. Additionally, the two guide rails 110 may allow the sliding tray 104 to move backward at least partially out of a rear formed by body 101 and cover 102. Stops may be used to prevent sliding tray 104 from falling out once assembled.

A removable front panel 105 and a removable rear panel 106 may include clips or latches 107 and 108 which removably secure front panel 105 and rear panel 106 to body 101 (clips/latches 107) and cover 102 (clips/latches 108) of fiber optic enclosure 100. Front panel 105 and rear panel 106 may be similar or identical, and one or both may include keyed locks 109 for additional security. Fiber optic splice enclosure 100 may be attached to equipment rails 301 of FIG. 1 with two mounting brackets 103. Mounting brackets 103 may have a plurality rows of through holes, which allow the installer to adjust the position of the mounting brackets 103 relative to the front of fiber optic splice enclosure 100 in order to control fiber optic splice enclosure 100's frontal projection.

The rear of body 101 may include cable entry cutouts on either side which can be initially covered by access covers 111. Sliding tray 104 may serve as a platform to which splicing trays can be secured. Sliding tray 104 can be extended almost completely out of the front or the back of the enclosure body for installing or servicing of fiber optic splices.

Figure 3:
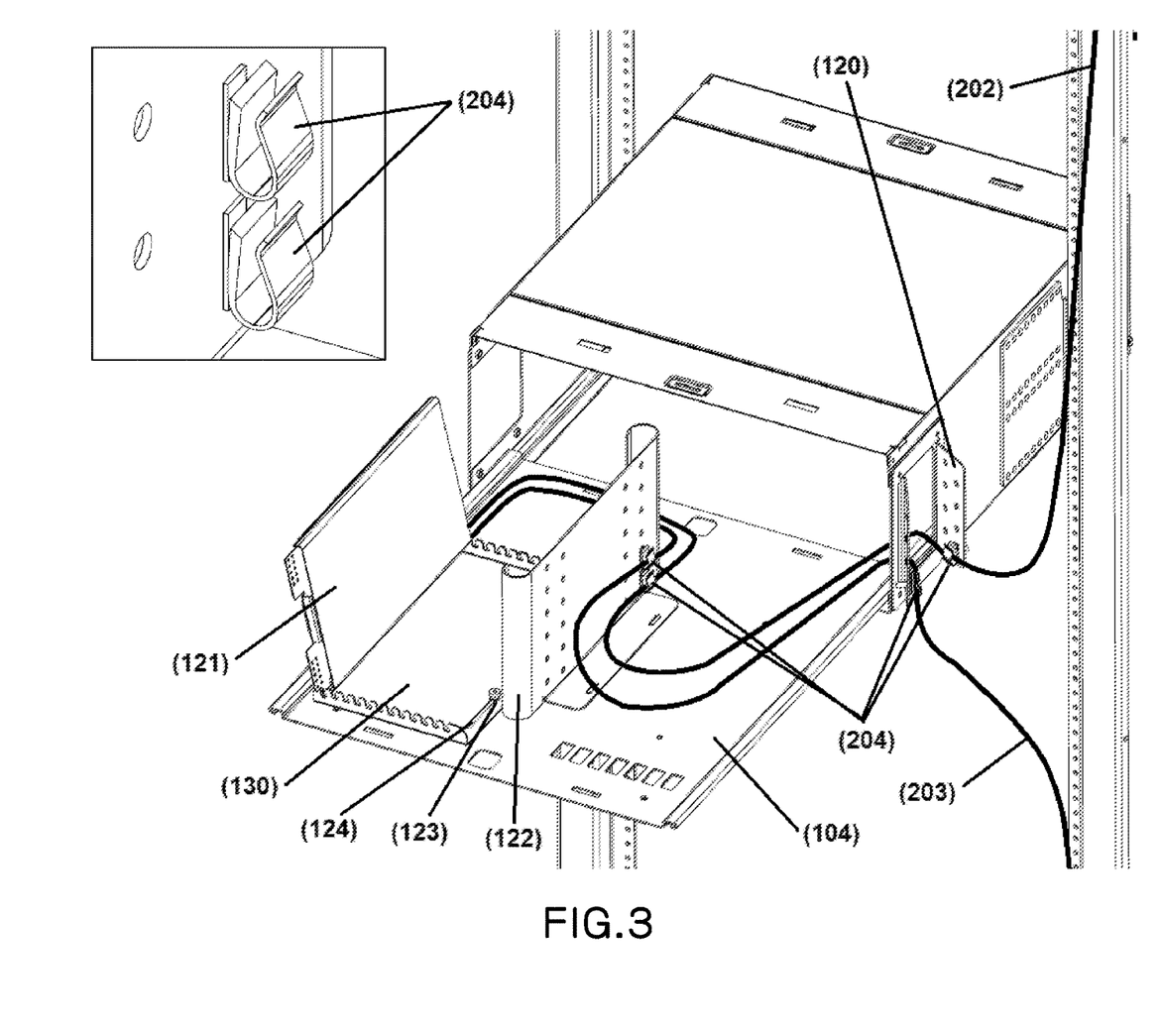
FIG. 3 shows an example fiber optic splice enclosure with an internal sliding tray extending out of the back of the enclosure.

FIG. 3 shows sliding tray 104 extended out the back opening of rack-mountable fiber optic splice enclosure 100. Referring to FIG. 3, for an example splice installation, rear panel 106 (shown in FIG. 2) is removed from fiber optic splice enclosure 100, and sliding tray 104 pulled at least partially out of the rear opening formed by body 101 and cover 102.

One of access covers 111 (shown in FIG. 2) is removed from one side of fiber optic splice enclosure 100 and replaced with a cable entry bracket 120. Cable entry bracket 120 has holes into which a variety of cable clips 204 can be installed to secure incoming cable 202 and equipment side cable 203. Cable plate 122 may be mounted to sliding tray 104 which provides an attachment location for cables 202 and 203. Cables 202 and 203 are looped on sliding tray 104 and secured to cable clips 204 on cable plate 122. The length of cables 202 and 203 between cable entry bracket 120 and cable plate 122 serve as slack and are routed with enough length to accommodate the movement of sliding tray 104 out the back and front of fiber optic splice enclosure 100.

A splice tray bracket 130, to which splice trays 121 can be mounted, is attached to either the left or right side of sliding tray 104 depending on, and opposite of, the side that cables 202 and 203 enter fiber optic splice enclosure 100. Splice tray bracket 130 is attached to sliding tray 104 using thumb screws 123 through slotted mounting holes 124 to allow linear repositioning of splice tray bracket 130 on sliding tray 104.

Incoming cables 202 and equipment side cables 203 are spliced together on splice trays 121. The large-radius edges of cable plate 122 provide bend radius control for cables 202 and 203 between cable plate 122 and splicing trays 121. Multiple cables can be spliced using the same method with additional cable clips 204 added to cable plate 122 and cable entry bracket 120 as needed to secure all cables 202 and 203.

Utilizing cable plate 122 to organize cables 202 and 203 vertically is beneficial because it simplifies future removal of splice trays 121 for service. Moreover, cables 202 and 203 attached to a splice tray 121 do not overlap from other splicing trays 121. Once the splicing work is complete, sliding tray 104 may be pushed back inside the fiber optic splice enclosure 100 and rear panel 106 reattached to enclosure 100.

Figure 4:
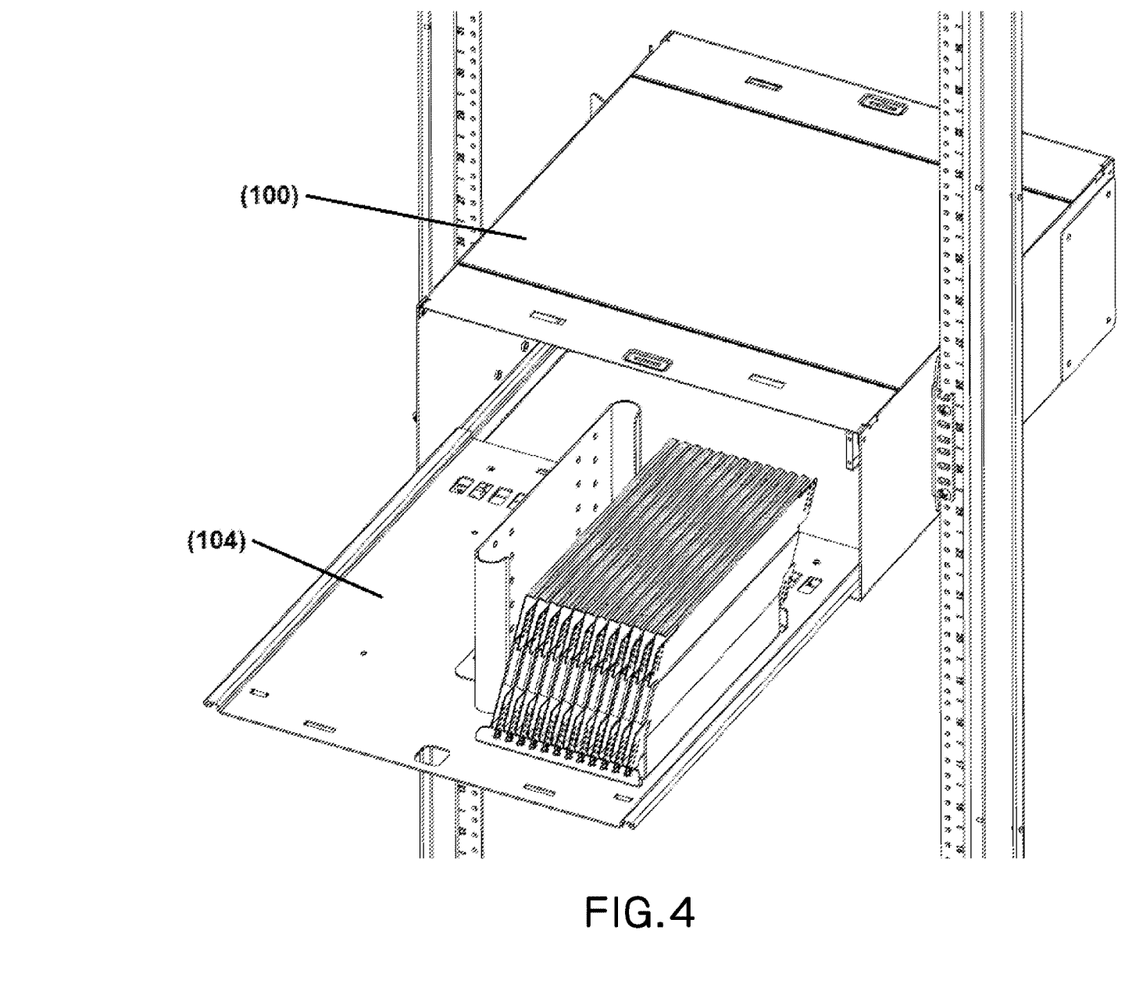
FIG. 4 shows an example fiber optic splice enclosure with the internal sliding tray extending out of the front of the enclosure.

Referring to FIG. 4, sliding tray 104 may also be pulled out through the front opening of fiber optic splice enclosure 100. To do this, front panel 105 (shown in FIG. 2) may be removed from fiber optic splice enclosure 100. With front panel 105 removed, sliding tray 104 may be pulled at least partially out of enclosure 100 through the front opening formed by body 101 and cover 102. Sliding tray 104 may be returned to the home position in enclosure 100, and front panel 105 may be reattached to enclosure 100.

Figure 5:
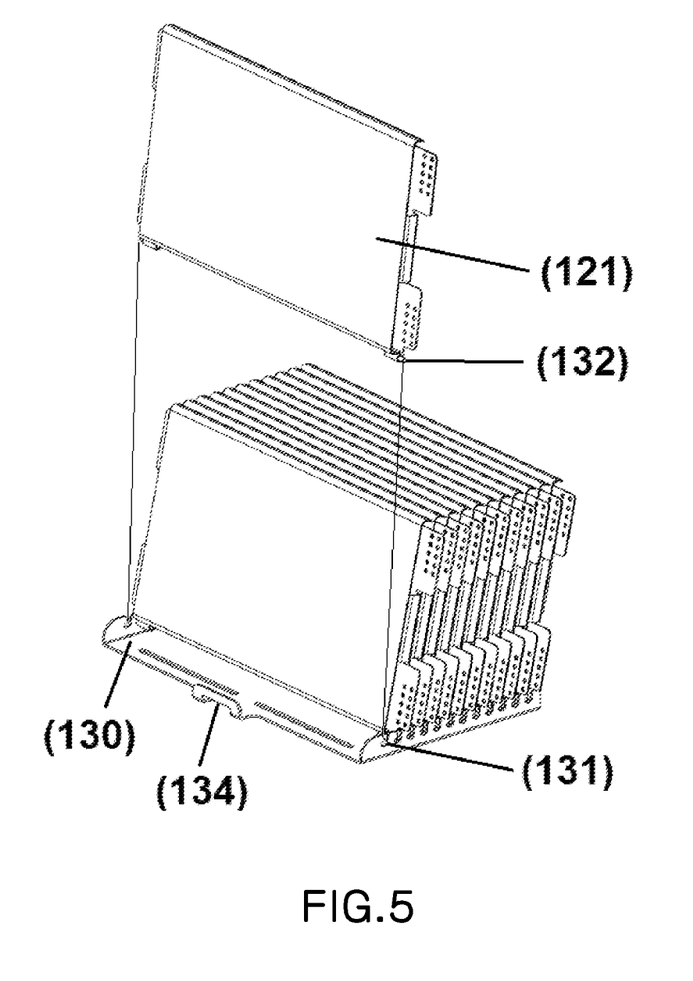
FIGS. 5 and 6 show detailed views of a splice tray bracket holding a plurality of splice trays.
Figure 6:
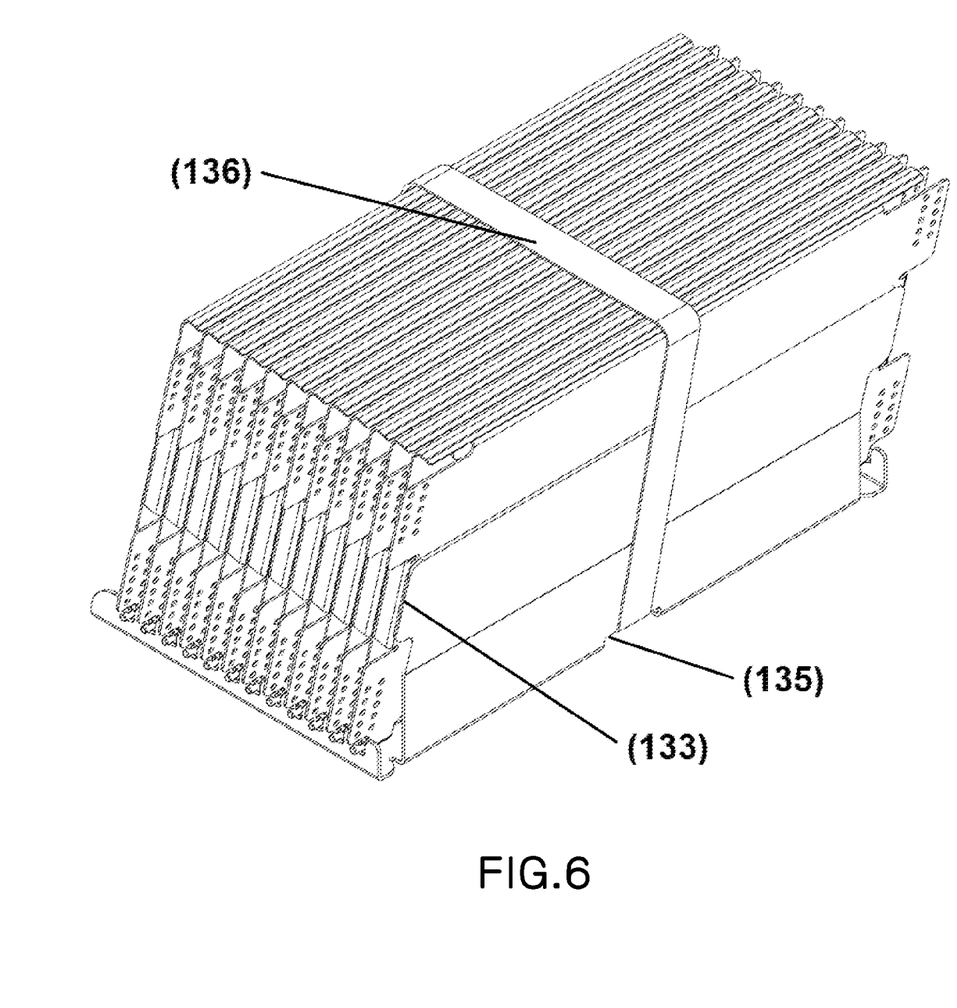
Figure 7:
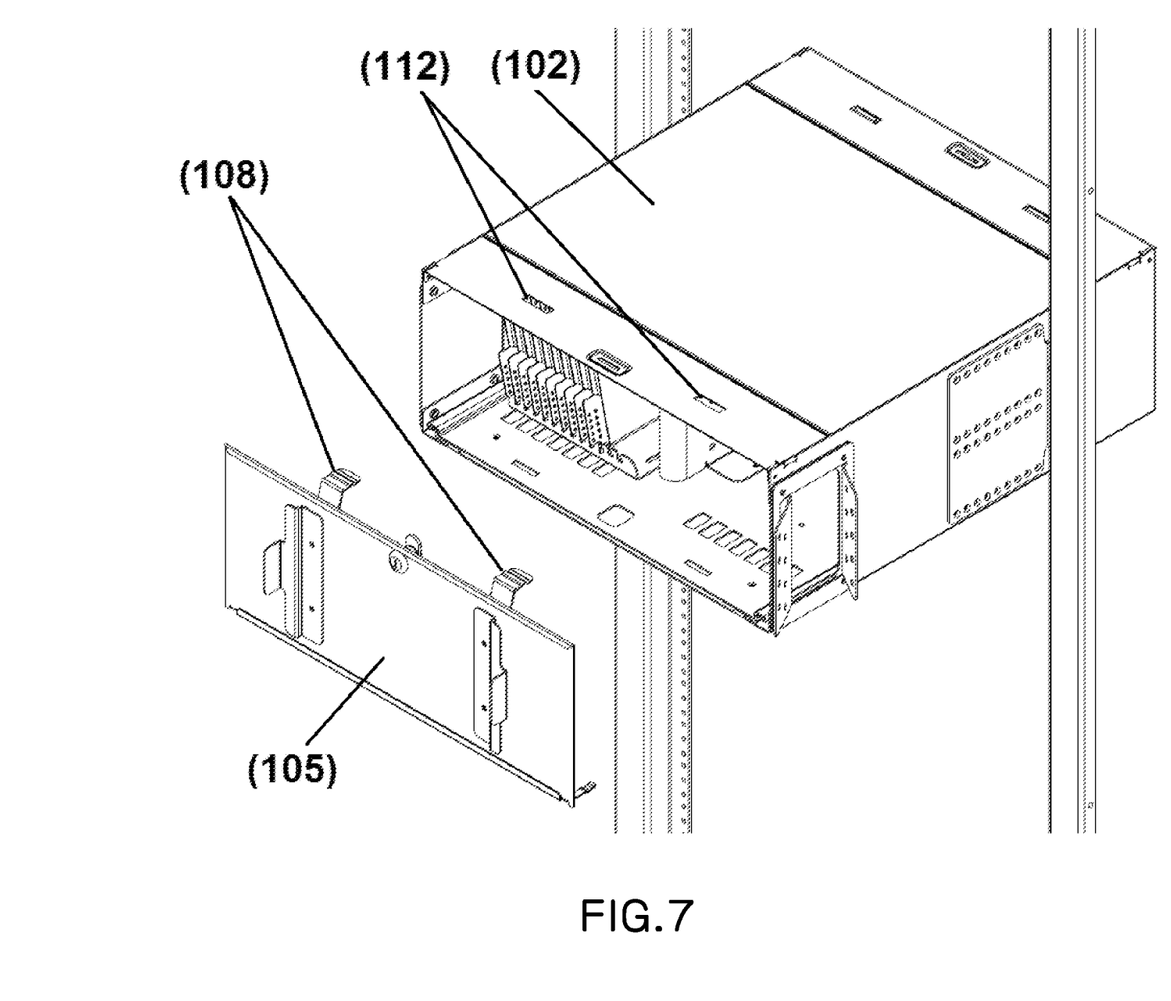
FIG. 7 shows a removable panel detached from an example fiber optic splice enclosure.
Figure 8:
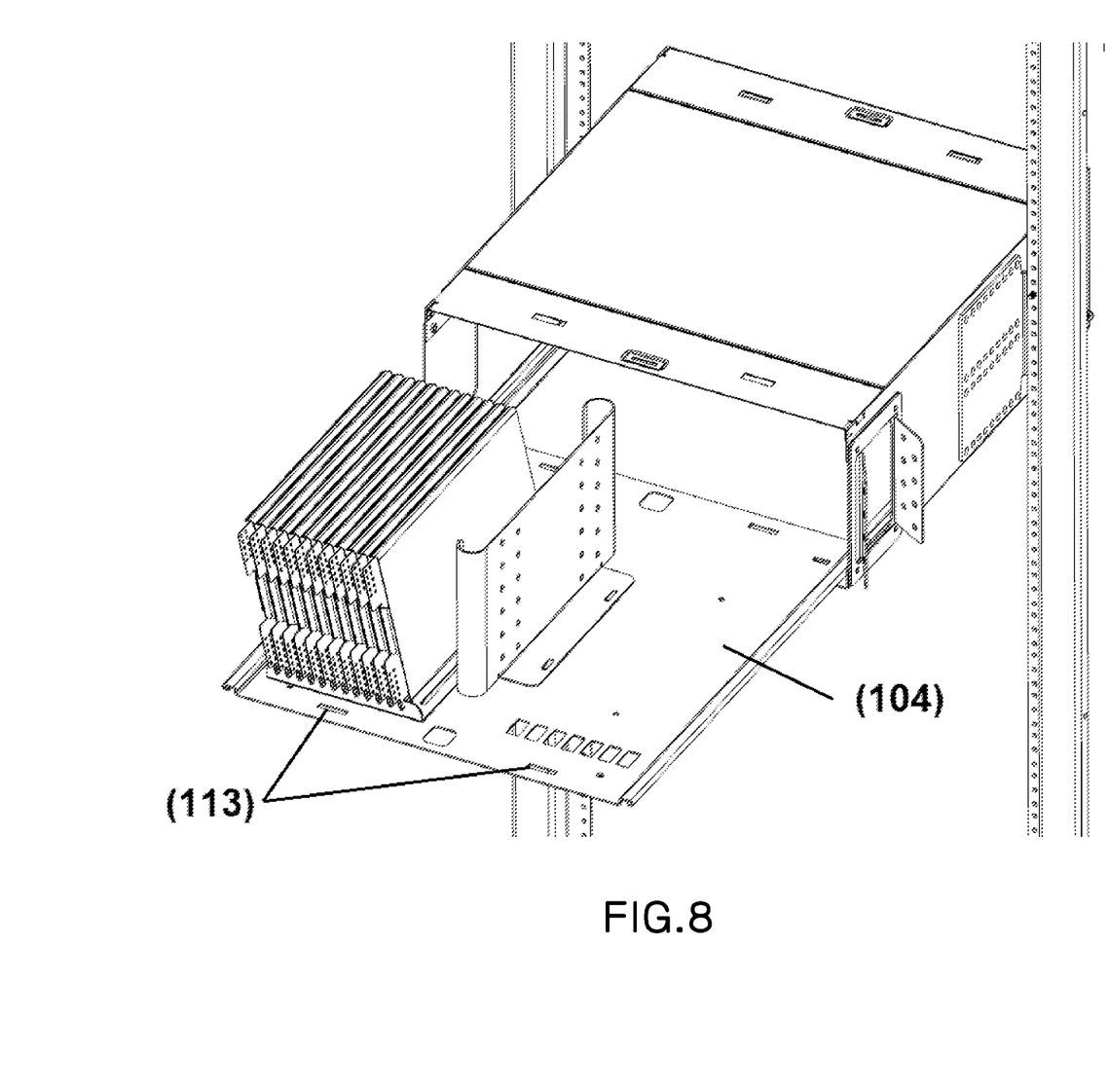
FIG. 8 shows an example fiber optic splice enclosure with the internal sliding tray extending out of the front of the enclosure.
Figure 9:
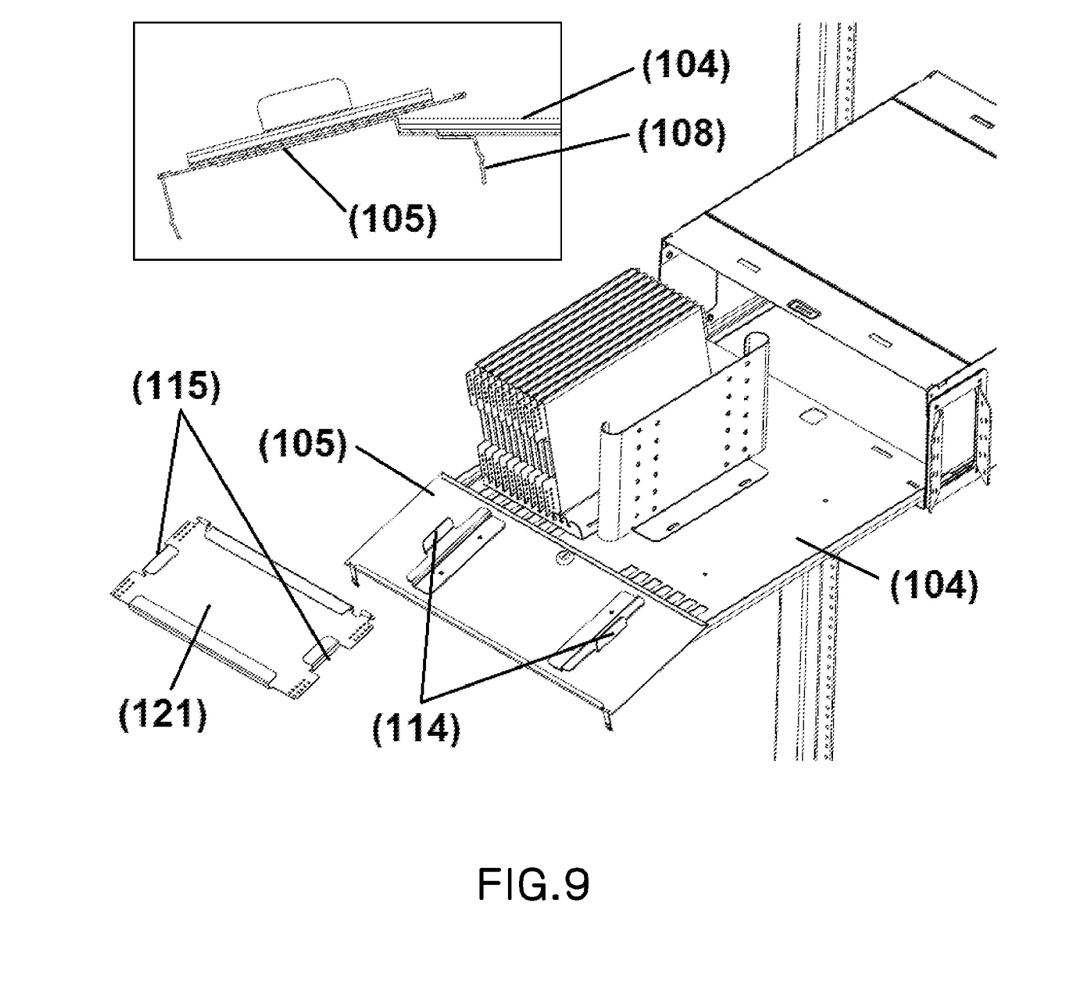
FIGS. 9 and 10 show a removable panel detached from an example fiber optic splice enclosure and being used as a work surface for a splice tray.
Figure 10:
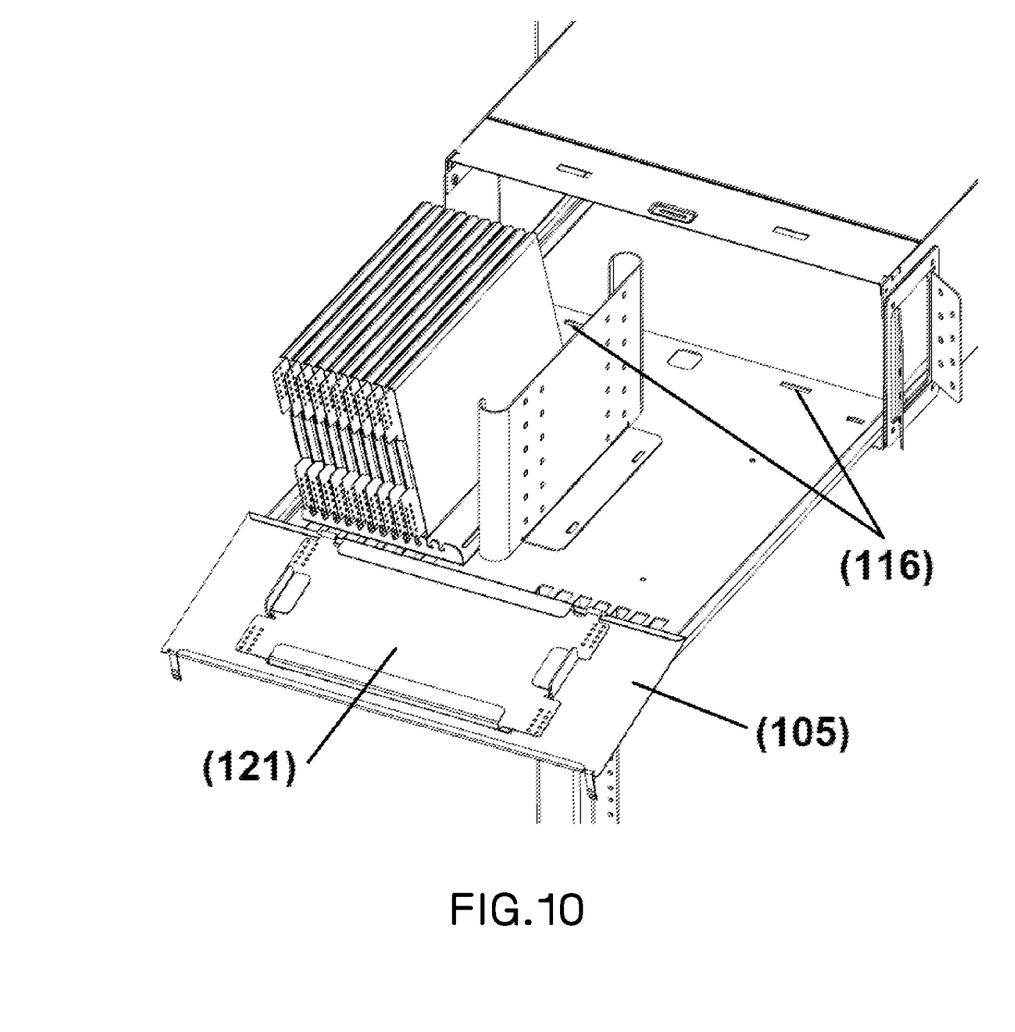

FIGS. 5 and 6 show detailed views of splice tray bracket 130 holding a plurality of splice trays 121. Referring to FIGS. 5 and 6, splice tray bracket 130 holds splice trays 121 in an upright, vertical, or relatively vertical (near vertical) position. Splice tray bracket 130 includes cutouts or notches 131 designed to accept mounting pins 132 of splice trays 121. This allows splice trays 121 to rotate about mounting pins 132 of splice trays 121. The rotational characteristic of splice trays 121 allows the user to easily sort through splice trays 121. The rearward rotation of splicing trays 121 is limited by a stop plate 133 on the rear of splice tray bracket 130 and defines the orientation in which splicing trays 121 are stored. A strip of hook and loop 136 is looped through slots 134 and 135 of splice tray bracket 130 to keep splice trays 121 secured.

FIGS. 7 to 10 illustrate the ability of removable rear panel 105 to be used as a holding/working surface for splice trays 121. Referring to FIGS. 7 to 10, when used as an access cover, upper latches 108 of removable rear panel 105 may snap into cutouts 112 in cover 102. Upper latches 108 of removable rear panel 105 may also be designed to be inserted into rear cutouts 113 in sliding tray 104 so that removable rear panel 105 can be attached to sliding tray 104 at an angle and serve as a holding/working surface for splice trays 121. A pair of handles 114 of removable rear panel 105 are designed to fit into the recessed portions 115 of splicing trays 121 to keep the splicing trays 121 stationary on removable rear panel 105.

The front of sliding tray 104 also includes front cutouts 116 so that front removable panel 106 (shown in FIG. 2) can also be used as a holding/working surface in similar fashion to removable rear panel 105 when sliding tray 104 is pulled out of the front opening.

Note that while the present disclosure includes several embodiments, these embodiments are non-limiting, and there are alterations, permutations, and equivalents which fall within the scope of this invention. Additionally, the described embodiments should not be interpreted as mutually exclusive. The described embodiments should instead be understood as potentially combinable if such combinations are permissive. It should also be noted that there are many alternative ways of implementing the embodiments of the present disclosure. It is therefore intended that claims that may follow will be interpreted as including all such alterations, permutations, and equivalents as fall within the true spirit and scope of the present disclosure.

The invention claimed is:

1. A rack-mountable fiber optic splice enclosure, comprising:
   a body including two opposing side walls, a bottom, and a cover;
   two guide rails attached to the bottom of the body;
   a sliding tray disposed on the two guide rails, the sliding tray including at least one splice tray; and
   a first removable panel removably attached to the cover via at least a first pair of latches and removably attached to the bottom via at least a second pair of latches,
   wherein the first removable panel is detachable from the cover and the bottom of the body, and
   wherein the first removable panel is attachable to the sliding tray at an angle to serve as a work surface for the at least one splice tray.

2. The rack-mountable fiber optic splice enclosure of claim 1, wherein the first removable panel includes a pair of handles that fit into recessed portions of the at least one splice tray.

3. The rack-mountable fiber optic splice enclosure of claim 1, wherein the first removable panel is attached to the sliding tray by sliding the at least the first pair of latches into cutouts in the sliding tray.

4. The rack-mountable fiber optic splice enclosure of claim 1, further comprising:
   a splice tray bracket mounted to the sliding tray to hold the at least one splice tray in an upright orientation.

5. The rack-mountable fiber optic splice enclosure of claim 4, wherein the splice tray bracket includes a plurality of notches to accept mounting pins of the at least one splice tray.

6. The rack-mountable fiber optic splice enclosure of claim 4, wherein the splice tray bracket includes a strip of hook and loop looped through a plurality of slots on the splice tray bracket to secure the at least one splice tray in place.

7. The rack-mountable fiber optic splice enclosure of claim 4, wherein:

the splice tray bracket includes a plurality of slotted mounting holes; and the splice tray bracket is mounted to the sliding tray by inserting thumb screws through the slotted mounting holes.

8. The rack-mountable fiber optic splice enclosure of claim 7, wherein the slotted mounting holes allow for linear repositioning of the splice tray bracket on the sliding tray.

9. The rack-mountable fiber optic splice enclosure of claim 1, further comprising:

a second removable panel detachable from the cover and the bottom of the body, and wherein the second removable panel is attachable to the sliding tray at an angle to serve as a work surface for the at least one splice tray.

10. The rack-mountable fiber optic splice enclosure of claim 9, wherein the first removable panel and the second removable panel each include a keyed lock.

11. The rack-mountable fiber optic splice enclosure of claim 1, further comprising:

a cable plate mounted to the sliding tray to provide attachment locations for fiber optic cables entering and exiting the rack-mountable fiber optic splice enclosure.

12. The rack-mountable fiber optic splice enclosure of claim 11, further comprising:

a plurality of cable clips attached to the cable plate to secure the fiber optic cables entering and exiting the rack-mountable fiber optic splice enclosure.

13. The rack-mountable fiber optic splice enclosure of claim 11, wherein the cable plate includes rounded edges to provide bend-radius control.

14. The rack-mountable fiber optic splice enclosure of claim 1, wherein the at least a first pair of latches is configured to engage cutouts in the cover of the body to removably attach the first removable panel to the cover.

15. The rack-mountable fiber optic splice enclosure of claim 14, wherein the at least the first pair of latches are insertable into cutouts in the sliding tray to attach the first removable panel to the sliding tray at an angle.

* * * * *